(12) United States Patent
Eidson et al.

(10) Patent No.: US 6,654,356 B1
(45) Date of Patent: Nov. 25, 2003

(54) DISTRIBUTED CONTROL SYSTEM ARCHITECTURE BASED ON SYNCHRONIZED CLOCKS

(75) Inventors: John C. Eidson, Palo Alto, CA (US); Jogesh Warrior, Mountain View, CA (US); Hans J. Sitte, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/182,252

(22) Filed: Oct. 29, 1998

(51) Int. Cl.[7] .............................. H04J 3/06; H04L 7/00; H04L 7/04
(52) U.S. Cl. ...................... 370/303; 370/507; 370/516; 375/354; 375/356; 375/362
(58) Field of Search ................................. 370/503, 507, 370/516; 375/354, 356, 362, 359; 340/825.2, 870.13, 870.14

(56) References Cited

U.S. PATENT DOCUMENTS

| | | | | | |
|---|---|---|---|---|---|
| 3,936,604 A | * | 2/1976 | Pommerening | ............ | 178/69.5 |
| 4,746,920 A | * | 5/1988 | Nellen et al. | ................ | 340/825 |
| 5,345,558 A | * | 9/1994 | Opher | ......................... | 395/200 |
| 5,566,180 A | * | 10/1996 | Eidson et al. | ............... | 370/94.2 |
| 5,907,685 A | * | 5/1999 | Douceur | ................. | 395/200.78 |
| 5,958,060 A | * | 9/1999 | Premerlani | .................. | 713/400 |
| 5,995,570 A | * | 11/1999 | Onvural et al. | .............. | 375/356 |
| 6,052,363 A | * | 4/2000 | Koch | ........................... | 370/252 |
| 6,243,834 B1 | * | 6/2001 | Garrett | ........................ | 714/37 |
| 6,324,586 B1 | * | 11/2001 | Johnson | ....................... | 709/248 |
| 6,335,931 B1 | * | 1/2002 | Strong et al. | ................. | 370/390 |

OTHER PUBLICATIONS

Authoritative Dictionary of IEEE Standards Terms, 7th Edition, Standards Information Network IEEE Press, pp. 15–16, 555.*

* cited by examiner

*Primary Examiner*—Seema S. Rao
*Assistant Examiner*—Ron Abelson

(57) ABSTRACT

A distributed system with an architecture based on synchronized clocks that provides accurate coordination of control functions. The distributed system includes a set of nodes coupled to a communication link. Each node has a clock which holds a real-world time. The nodes participate in a synchronization protocol on the communication link for synchronizing the real-world time in each clock. The architecture of the distributed system is such that the synchronization of control functionality in the distributed system is based upon the real-world time in the clocks. A variety of examples of applications for this architecture are set forth.

13 Claims, 2 Drawing Sheets

DISTRIBUTED CONTROL SYSTEM ARCHITECTURE BASED ON SYNCHRONIZED CLOCKS

BACKGROUND OF THE INVENTION

1. Field of Invention

The present invention pertains to the field of distributed systems. More particularly, this invention relates to a distributed control system architecture which is based on synchronized clocks.

2. Art Background

Distributed control systems are commonly arranged as a collection of nodes which are interconnected via one or more communication links. Any one or more of the nodes may perform a sensor function or an actuator function or a control function or combination thereof for one or more associated applications in the control system.

The coordination of control functions in a distributed control system usually includes the communication of events among the nodes. These events include sampling events such as when a node with an attached sensor obtains a data sample from the attached sensor. These events also include events such as when a node that implements a control process changes the state of its control process.

Such events when communicated among the nodes of a distributed control system may cause other events to occur. For example, a sampling event when communicated to a node that implements a control process may cause a change of state of the control process. In addition, the nodes of a distributed control system typically communicate to other nodes that actions should be taken. For example, a node with an attached actuator may be instructed that a control value should be applied to the attached actuator.

Such events and communications of actions to be taken are typically communicated among the nodes of a distributed control using messages which are transferred via the communication links that connect the nodes. For example, a first node usually causes a second node to perform a particular action by transferring a message to the second node via the communication link that interconnects the first and second nodes. The message typically contains information that when interpreted by the second node causes it to perform the particular action.

In a typically prior distributed control system, the time at which the second node performs the particular action depends on the time at which the message specifying the particular action is received by the second node and the time taken by the second node to interpret the message. Typically, an inaccuracy in the timing of message transfer between the first and second nodes can introduce uncertainty in the time at which the particular action is performed by the second node. For example, collisions may occur on the communication link or the communication link may include gateways or other devices that introduce variation or jitter in the timing of message transfer between the first and second nodes. In addition, the time taken by the second node to interpret the message specifying the particular action can vary depending upon other activities that may be underway in the second node when the message is received. Unfortunately, these uncertainties in the actual time that specified actions are taken can cause inaccuracy in the coordination of control functions in a distributed control system.

SUMMARY OF THE INVENTION

A distributed system is disclosed with an architecture based on synchronized clocks that provides accurate coordination of control functions. The distributed system includes a set of nodes coupled to a communication link. Each node has a clock which holds a real-world time. The nodes participate in a synchronization protocol on the communication link for synchronizing the real-world time in each clock. The architecture of the distributed system is such that the synchronization of control functionality in the distributed system is based upon the real-world time in the clocks. A variety of examples of applications for this architecture are set forth.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
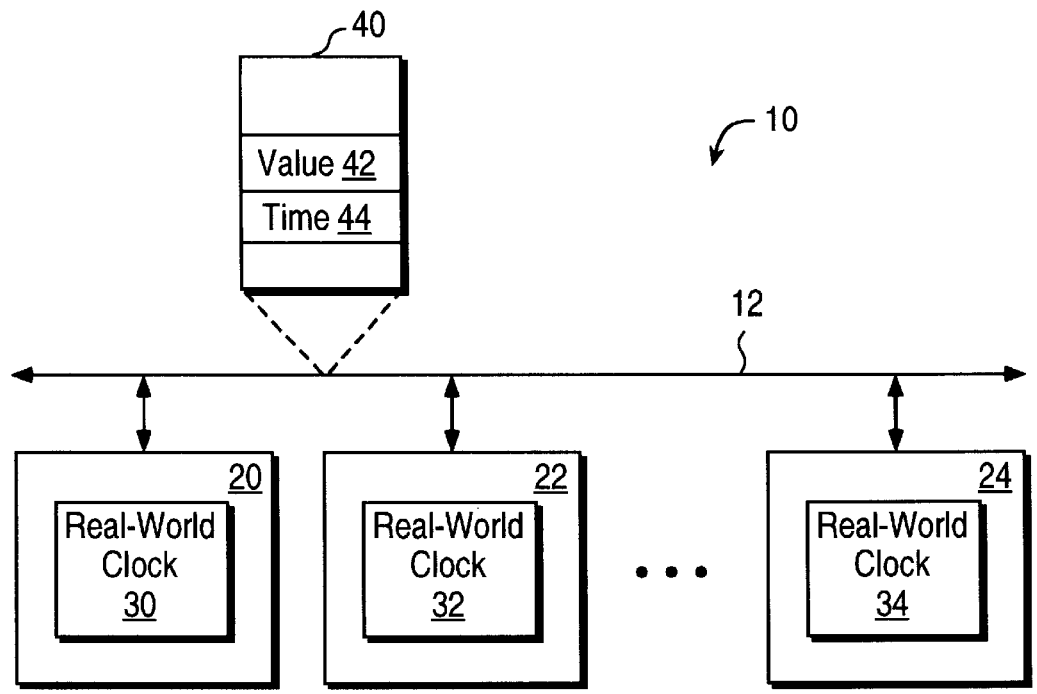
FIG. 1 illustrates a distributed system having an architecture which is based on synchronized clocks that hold real-world time.

FIG. 1 illustrates a distributed system 10 having an architecture which is based on synchronized clocks that hold real-world time. The distributed system 10 includes a set of nodes 20–24 that communicate via a communication link 12. The nodes 20–24 include a set of real-world clocks 30–34, respectively. The nodes 20–24 may be referred to as "peer" nodes in that they exchange messages via the communication link 12 when coordinating control functions in the distributed system 10.

The nodes 20–24 may be any type of node in the distributed system 10. For example, any one or more of the nodes 20–24 may be a sensor node having one or more associated sensors, or an actuator node having one or more associated actuators, or an application controller node that performs a control process or a combination of any these types of nodes. Any one or more of the nodes 20–24 may have embedded processors or may be embodied as a computer system such as a personal computer.

Each of the real-world clocks 30–34 is a real-time clock that reflects a real-world time base such as UTC time which was formerly known as Greenwich Mean Time (GMT). The nodes 20–24 participate in a synchronization protocol for synchronizing the time values held in the real-world clocks 30–34. The synchronization protocol is provided so that the real-world clocks 30–34 hold real-world time values that agree to an accuracy suitable for particular applications implemented in the distributed system 10.

The synchronization of control functionality in the distributed system 10 is based upon the real-world time base provided by the synchronized real-world clocks 30–34. Any one or more of the nodes 20–24 may transfer messages via the communication link 12 that contain prescriptions of actions to be taken or that identify events that have taken place in the distributed system 10. The nodes 20–24 that receive these messages interpret these messages based upon the real-world time provided by its corresponding real-world clock 30–34.

The synchronization of control functionality in the distributed system 10 is not based on periodic message transfer as may be the case in prior systems in which synchronization of events is based on periodic cycles. For example, any one or more of the nodes 20–24 may asynchronously transfer messages via the communication link 12 that contain prescriptions of actions to be taken or that identify events that have taken place. These messages may be called asynchronous in that they are not related in time to any periodic cycles in the distributed system 10 and are instead generated and interpreted using the real-world clocks 30–34.

In contrast to prior systems, the distributed system 10 places no restrictions on the latency of message transfer via the communication link 12 other than that a message must arrive in time at its destination so as to not violate causality. For example, a message to a receiving node that causes a sample to be obtained by the receiving node at a particular real-world time should arrive at the receiving node prior to the particular real-world time. There is, however, no requirement that the message arrive within a specified time interval after being transmitted from an originating node as is commonly a requirement in prior systems.

A message 40 is shown which is originated by the node 20 and consumed by the node 22 and possibly other nodes accessible via the communication link 12. The message 40 carries a value 42 and a time 44 as a data pair. The value 42 may be a sensor data sample or an actuator control value or an event identifier. The time 44 is a real world time associated with the value 42. The node 22 may have a prescription for performing a particular action which depends on the information provided by the value 42 and the time 44 data pair. The node 22 uses its real-world clock 32 to interpret the message 40 and perform the appropriate action. The action may be to obtain data sample, to perform some actuation function, or to change state of a control process, for example a proportional integral differential (PID) process, or a combination of any of these.

For example, the value 42 may be a sensor data sample and the time 44 may be a real-world time at which the sensor data sample was obtained by the node 20. The node 20 obtained the time 44 from its real-world clock 30 when it obtained the sensor data sample from an attached sensor. The node 22 may implement a prescription in which it is to perform an actuation function 10 seconds after the sensor data sample carried in the message 40 was obtained. In response to the message 40, the node 22 adds 10 seconds to the time 44 and uses the resulting time as a real-world trigger time for its actuation function. The node 22 then triggers its prescribed actuation function when its real-world clock 32 reaches the calculated real-world trigger time.

In another example, the value 42 may be a control value to be applied to an actuator attached to the node 22 and the time 44 may be a real-world time at which the value 42 is to be applied. In response to the message 40, the node 22 reads its real-world clock 32 and at the appropriate trigger time provided by the time 44 applies the value 42 to its attached actuator.

In another example, the value 42 may be a sensor data sample and the time 44 may be a real-world time at which the sensor data sample was obtained by the node 20 and the node may 22 implement a PID process and consume the value 42 and the time 44 data pair in its PID calculations. The PID process assigns a real-world time value to each new control value it generates which indicates a real-world time at which the new control value is to be applied to an actuator. The node 22 may apply the new control value to an attached actuator at the calculated real world time or may transfer the new control value and calculated real-world time as a data pair to another node that is attached to an appropriate actuator involved in the PID process.

The architecture of the distributed system 10 which is based upon synchronized real-world time in the nodes 20–24 enables an enhancement in error handling. The detection of abnormal behavior in the distributed system 10 may be based on real-world time and the corresponding corrective actions may include prescriptions which are based on real-world time. For example, the node 24 may have a prescription for a corrective action to be taken if a message is not received within 10 minutes of a real-world time contained in an earlier received message. This enables more precise detection of errors and more precise undertaking of corrective actions.

In addition, a corrective action may be scheduled to take place at a particular a real-world time. Moreover, the type of corrective action to undertaken may be dependant on the real-world time at which a failure occurs. All these enhancements are enabled by providing real-world time in messages transferred among the nodes 20–24 and providing the synchronized real-world clocks 30–34 in the nodes 20–24 for interpreting the messages and error handling prescriptions.

In one embodiment, the synchronization protocol adhered to by the nodes 20–24 is described in U.S. Pat. No. 5,566,180. For example, each of the nodes 20–24 may include circuitry for adjusting the locally stored time value in its respective real-world clock 30–34 based upon computations of the sending and receiving time of time data packets which are transferred over the communication link 12. The adjustment of a locally stored time value may be accomplished by implementing each real-world clock 30–34 as a counter driven by an oscillator with sufficient stability. The least significant few bits of the counter may be implemented as an adder so that the increment on oscillator periods may be occasionally increased or decreased to effectively speed up or slow down the local clock in accordance with the results of the computation. This synchronization protocol offers the advantage of relatively low bandwidth utilization on the communication link 12 so as not to impede messaging associated with control functions.

In another embodiment, the synchronization protocol implemented by the nodes 20–24 is the network time protocol (NTP). In accordance with NTP, the nodes 20–24 periodically exchange messages via the communication link 12. Each message contains a time value from the real-world clock 30–34 of the node 20–24 that originated the message. In response, each node 20–24 adjusts its real-world clock 30–34. Eventually, the real-world clocks 30–34 in the nodes 20–24 converge.

One of the nodes 20–24 or another node elsewhere which is reachable via the communication link 12 may include a traceable time source that introduces traceable time values into the distributed system 10. A traceable time value may be defined as a time value which is derived from a standard time such as UTC time which was formerly known as Greenwich Mean Time (GMT). The nodes 20–24 synchronize to the traceable time values introduced by the traceable time source. An example of a traceable time source is a global positioning system (GPS) receiver. Other examples of traceable time sources include radio broadcast time sources such as WWV or atomic clocks.

The communication link 12 may be implemented with one or more of a variety of communication mechanisms. In one embodiment, the communication link 12 is an Ethernet communication network. In another embodiment, the communication link 12 is a LonTalk field-level control bus which is specialized for the process control environment. In other embodiments, the communication link 12 may be implemented with time division multiple access (TDMA) or token ring protocols to name only a few possibilities. In addition, the communication link 12 may include one or more intervening communication devices such as repeaters, switching hubs, and gateways.

Figure 2:
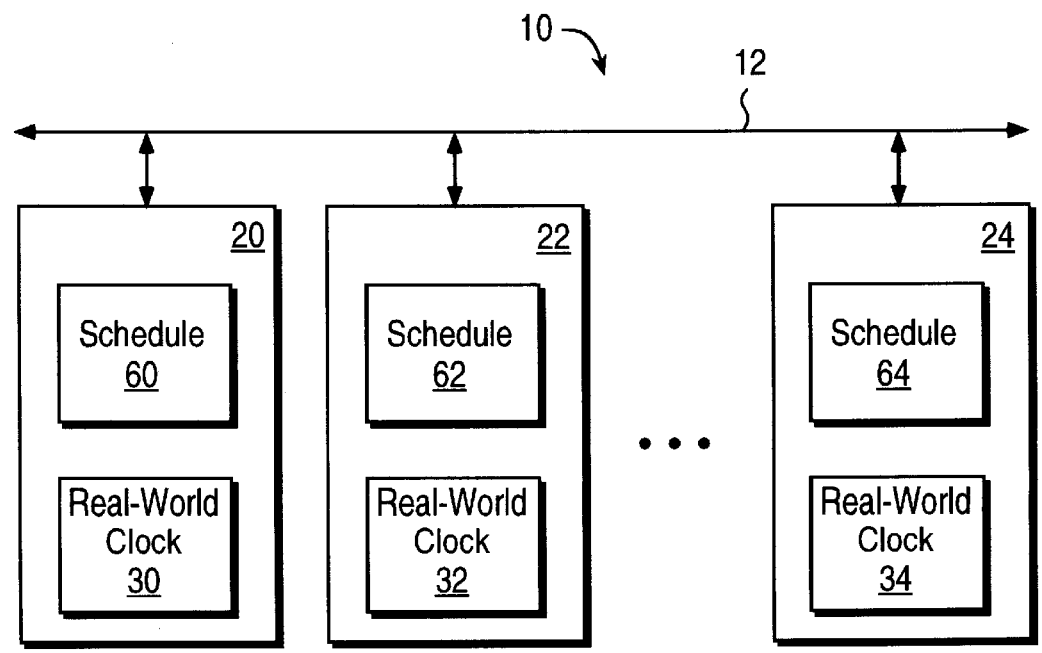
FIG. 2 illustrates a distributed system in which its architecture based upon real-world time facilitates calender scheduling.

FIG. 2 illustrates an embodiment of the distributed system 10 in which its architecture based upon real-world time facilitates calender scheduling. Each of the nodes 20–24 is provided with a set of corresponding schedules 60–64. Each schedule 60–64 specifies actions to be taken at specified real-world times by the nodes 20–24, respectively. Each of the nodes 20–24 monitors its corresponding real-world clock 30–34 to determine when to perform the specified actions. This is in contrast to prior systems in which a central controller or a control node distributes control messages to remote nodes at scheduled times. Such prior systems must take into account the latency of communication in the system in order to ensure schedules are met. The distributed system 10 has no such constraint on communication latency among the nodes 20–24.

One or more of the schedules 60–64 may specify that the corresponding node 20–24 periodically perform an action and report the results of the action using a message transferred via the communication link 12. The architecture of the distributed system 10 with its synchronized real-world clocks 30–34 enables the nodes 20–24 to periodically take the action and report results in the absence of an explicit request messages from a central controller. This decreases the amount of traffic that would otherwise be present on the communication link 12.

In another example, the schedules 60–64 may specify that the nodes 20–24 obtain a measurement every 100 milliseconds and that all measurements obtained by the nodes 20–24 occur within one millisecond of each other. With the architecture of the distributed system 10 which is based upon real-world time, the one millisecond requirement may be met with the appropriate internal design of the nodes 20–24 and the appropriate selection of a synchronization protocol for the real-world clocks 30–34 to provide the requisite accuracy. In prior systems, the one millisecond requirement would impose low latency requirements on synchronization messages which are broadcast from a central controller or control node.

Figure 3:
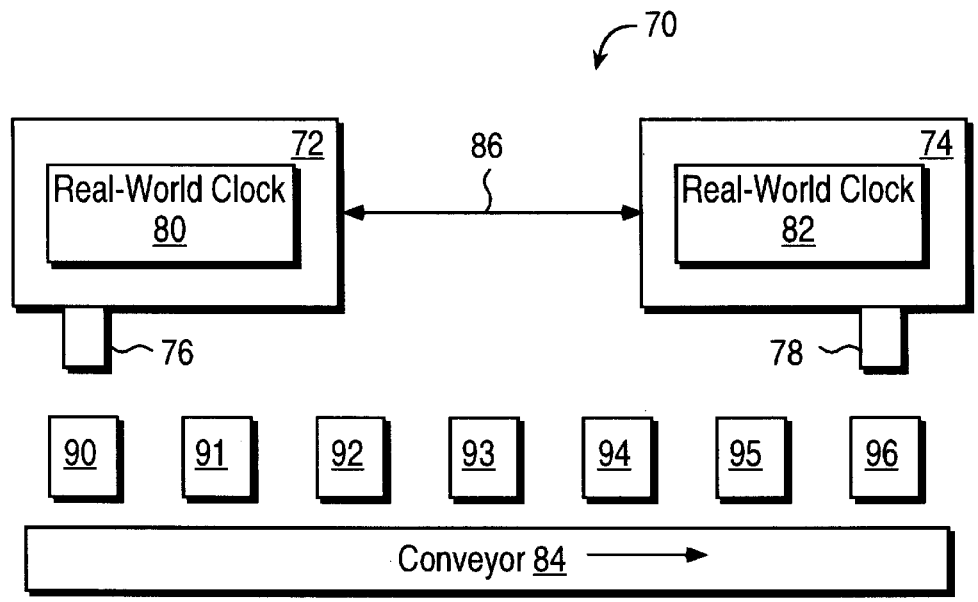
FIG. 3 illustrates a reactive system with an architecture that is based upon real-world time.

FIG. 3 illustrates a reactive system 70 with an architecture that is based upon real-world time. The reactive system 70 is a distributed system which includes a pair of nodes 72–74 that communication via a communication link 86. The nodes 72–74 include corresponding real-world clocks 80–82 which are synchronized using a synchronization protocol on the communication link 86.

The node 72 has an attached sensor 76 and the node 74 has an attached actuator 78. The node 72 renders an observation using the sensor 76 and the node 74 uses the actuator 78 to perform an action that depends on the observation made by the node 72. The observation and/or information derived from the observation is communicated using message transfer via the communication link 86. The node 72 includes real-world time values obtained from its real-world clock 80 in these messages and the node 74 interprets these messages based on real-world time and drives the actuator 78.

For example, the reactive system 70 may be a materials handling system in which a series of items 90–96 are carried on a conveyor 84. The sensor 76 obtains a measurement for each item 90–96 and the actuator 78 is used to remove any of the items 90–96 that meet some criteria associated with the measurement. The sensor 76 may measure the fullness of the items 90–96 and the actuator 78 may be used to remove any of the items 90–96 which are not full.

Assume, for example, that the item 90 is to be removed because the sensor 76 indicates that it is not full. The node 74 uses the actuator 78 to remove the item 90 based upon a computation of the real-world time at which the item 90 will arrive at the actuator 78. The node 72 may compute the real-world arrival time of the item 90 at the actuator 78 and transfer it to the node 74 in a message. Alternatively, the node 72 may transfer the real-world time at which the item 90 passed the sensor 76 in a message to the node 74 and in response the node 74 computes the real-world arrival time of the item 90 at the actuator 78.

The node 72 may send redundant messages, that is messages containing the same information, to the node 74 in response to conditions in which messages may be lost such as noise on the communication link 86. The reactive system 70 with its architecture based upon real-world time allows redundant message without the problems they usually cause in prior systems. This is because the redundant messages contain real-world time and are interpreted using the real-world clock in the node 74 and not on the latency of message transfer. For example, a message from the node 72 may contain information that instructs the node 74 to remove an item from the conveyor 84 at 10 AM. Multiple receipts of messages containing this information by the node 74 will cause the removal of only the item that passes the actuator 78 at 10 AM. In prior systems, each redundant message may cause the removal of an unintended item since in those systems item removal is linked to the timing of the receipt of messages.

Figure 4:
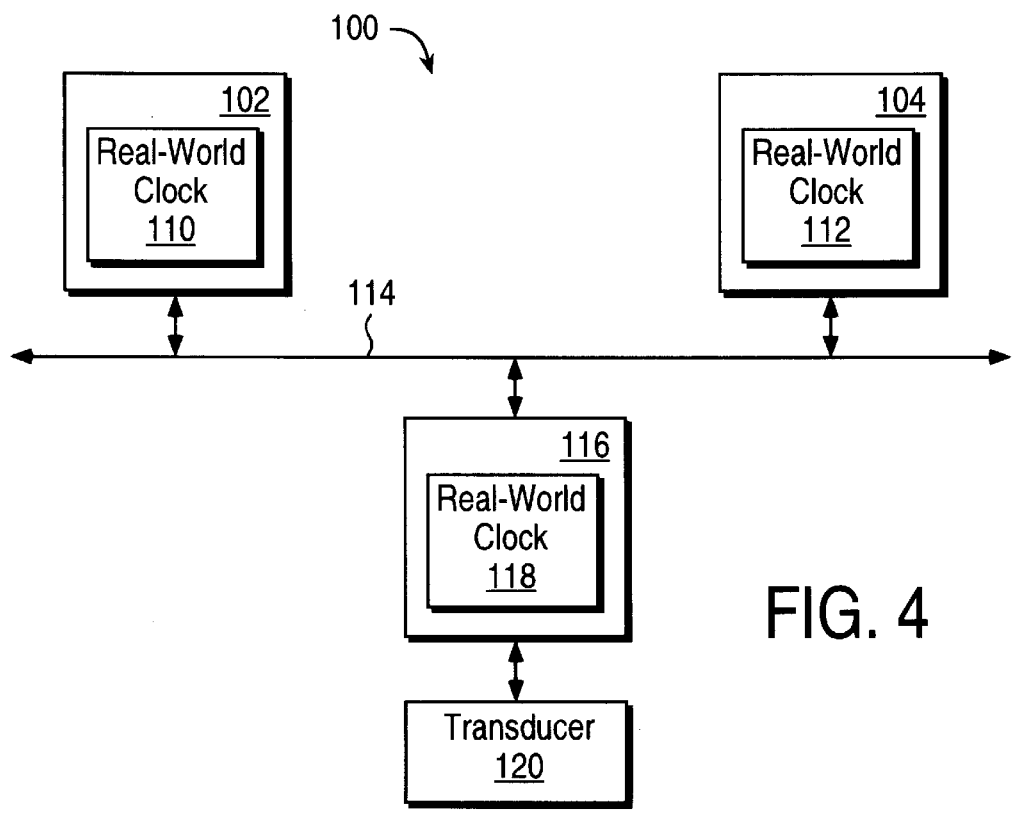
FIG. 4 illustrates a distributed system with an architecture based upon real-world time that facilitates the allocation of shared resources.

FIG. 4 illustrates a distributed system 100 with architecture based upon real-world time that facilitates the allocation of shared resources. A pair of nodes 102–104 are shown both of which access a transducer 120 which is attached to a node 116. For example, the node 102 may implement a control loop application for the transducer 120 and the node 104 may implement a monitoring application using the transducer 120.

The nodes 102–104 and 116 include corresponding real-world clocks 110–112 and 118 which are synchronized using a synchronization protocol on the communication link 114. The real-world clocks 110–112 and 118 enable allocation of access to the transducer 120 among the applications in the nodes 102–104, as well as other applications in the distributed system 100 based upon real-world time. For example, an application in the node 102 may have a schedule that allocates to it access to the transducer 120 every odd hour, minute, or second, etc. while the node 104 is allocated access to the transducer 120 every even hour, minute, or second, etc.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A distributed system comprising:
 a set of nodes coupled to a communication link, each node having a clock which generates a corresponding time value for synchronizing one or more control functions in the corresponding node, each node participating in a synchronization protocol for synchronizing the time values in the clocks by exchanging a set of timing messages via the communication link;

means for providing a traceable time value to the distributed system such that the clocks synchronize the time values to the traceable time value using the synchronization protocol and provide a real-world time base for synchronizing the control functions among the nodes wherein one of the nodes transfers a message via the communication link that contains an identification of an event that has taken place in the distributed system and another of the nodes receives the message and interprets the message based upon the time value in the corresponding clock.

2. A distributed system comprising:

a set of nodes coupled to a communication link, each node having a clock which generates a corresponding time value for synchronizing one or more control functions in the corresponding node, each node participating in a synchronization protocol for synchronizing the time values in the clocks by exchanging a set of timing messages via the communication link;

means for providing a traceable time value to the distributed system such that the clocks synchronize the time values to the traceable time value using the synchronization protocol and provide a real-world time base for synchronizing the control functions among the nodes wherein a first one of the nodes transfers a message via the communication link that contains a value and a time as a data pair and a second one of the nodes receives the message and performs an action in response to the data pair and in response to the time value in the clock in the second one of the nodes and the value is a sensor data sample and the time is a real-world time associated with the sensor data sample which was obtained from the clock in the first one of the nodes.

3. A distributed system comprising:

a set of nodes coupled to a communication link, each node having a clock which generates a corresponding time value for synchronizing one or more control functions in the corresponding node, each node participating in a synchronization protocol for synchronizing the time values in the clocks by exchanging a set of timing messages via the communication link;

means for providing a traceable time value to the distributed system such that the clocks synchronize the time values to the traceable time value using the synchronization protocol and provide a real-world time base for synchronizing the control functions among the nodes wherein a first one of the nodes transfers a message via the communication link that contains a value and a time as a data pair and a second one of the nodes receives the message and performs an action in response to the data pair and in response to the time value in the clock in the second one of the nodes and the value is an actuator control value and the time is a real-world time associated with the actuator control value such that the second one of the nodes performs the action by applying the actuator control value to an actuator when the time matches the time value in the clock of the second one of the nodes.

4. A distributed system comprising:

a set of nodes coupled to a communication link, each node having a clock which generates a corresponding time value for synchronizing one or more control functions in the corresponding node, each node participating in a synchronization protocol for synchronizing the time values in the clocks by exchanging a set of timing messages via the communication link;

mean for providing a traceable time value to the distributed system such that the clocks synchronize the time values to the traceable time value using the synchronization protocol and provide a real-world time base for synchronizing the control functions among the nodes wherein a first one of the nodes transfers a message via the communication link that contains a value and a time as a data pair and a second one of the nodes receives the message and performs an action in response to the data pair and in response to the time value in the clock in the second one of the nodes and the value is an event identifier and the time is a real-world time associated with the event identifier which was obtained from the clock in the first one of the nodes.

5. A distributed system comprising:

a set of nodes coupled to a communication link, each node having a clock which generates a corresponding time value for synchronizing one or more control functions in the corresponding node, each node participating in a synchronization protocol for synchronizing the time values in the clocks by exchanging a set of timing messages via the communication link;

means for providing a traceable time value to the distributed system such that the clocks synchronize the time values to the traceable time value using the synchronization protocol and provide a real-world time base for synchronizing the control functions among the nodes wherein a first one of the nodes transfers a message via the communication link that contains a value and a time as a data pair and a second one of the nodes receives the message and performs an action in response to the data pair and in response to the time value in the clock in the second one of the nodes and the action is to obtain a data sample.

6. A distributed system comprising:

a set of nodes coupled to a communication link, each node having a clock which generates a corresponding time value for synchronizing one or more control functions in the corresponding node, each node participating in a synchronization protocol for synchronizing the time values in the clocks by exchanging a set of timing messages via the communication link;

means for providing a traceable time value to the distributed system such that the clocks synchronize the time values to the traceable time value using the synchronization protocol and provide a real-world time base for synchronizing the control functions among the nodes wherein a first one of the nodes transfers a message via the communication link that contains a value and a time as a data pair and a second one of the nodes receives the message and performs an action in response to the data pair and in response to the time value in the clock in the second one of the nodes and the action is to change a state of a control process.

7. A distributed system comprising:

a set of nodes coupled to a communication link, each node having a clock which generates a corresponding time value for synchronizing one or more control functions in the corresponding node, each node participating in a synchronization protocol for synchronizing the time values in the clocks by exchanging a set of timing messages via the communication link;

means for providing a traceable time value to the distributed system such that the clocks synchronize the time values to the traceable time value using the synchronization protocol and provide a real-world time base for synchronizing the control functions among the nodes wherein the real-world time base in the clocks is used to detect an abnormal behavior in the distributed system and the real-world time base in the clocks is used when applying a corrective action for the abnormal behavior.

8. A distributed system comprising:

a set of nodes coupled to a communication link, each node having a clock which generates a corresponding time value for synchronizing one or more control functions in the corresponding node, each node participating in a synchronization protocol for synchronizing the time values in the clocks by exchanging a set of timing messages via the communication link;

means for providing a traceable time value to the distributed system such that the clocks synchronize the time values to the traceable time value using the synchronization protocol and provide a real-world time base for synchronizing the control functions among the nodes wherein the nodes include a first node having a sensor and a second node having an actuator, the first node rendering an observation using the sensor and the second node performing an action using the actuator that depends on the observation rendered by the first node such that the first node communicates the observation to the second node using a message transferred via the communication link, the message including a real-world time from the clock in the first node obtained when the observation was rendered and the second node interpreting the message using the time value from the clock in the second node.

9. A distributed system comprising:

a set of nodes coupled to a communication link, each node having a clock which generates a corresponding time value for synchronizing one or more control functions in the corresponding node, each node participating in a synchronization protocol for synchronizing the time values in the clocks by exchanging a set of timing messages via the communication link;

means for providing a traceable time value to the distributed system such that the clocks synchronize the time values to the traceable time value using the synchronization protocol and provide a real-world time base for synchronizing the control functions among the nodes wherein the nodes include a first node having a transducer and a second node that performs a first application associated with the transducer and a third node that performs a second application associated with the transducer such that the second and third nodes share the transducer based on the real-world time base in the clocks.

10. A method for synchronizing a set of control functions in a distributed system, comprising the steps of:

synchronizing a time value in a clock in each of a set of nodes in the distributed system by exchanging a set of timing messages among the nodes;

synchronizing one or more of the control functions in each node in response to the time values in the corresponding clock;

providing a traceable time value to the distributed system such that the clocks synchronize the time values to the traceable time value when synchronizing and provide a real-world time base when synchronizing the control functions among the nodes;

transferring a message to one or more of the nodes that contains an identification of an event that has taken place in the distributed system;

interpreting the message based upon real-world time base.

11. A method for synchronizing a set of control functions in a distributed system, comprising the steps of:

synchronizing a time value in a clock in each of a set of nodes in the distributed system by exchanging a set of timing messages among the nodes;

synchronizing one or more of the control functions in each node in response to the time values in the corresponding clock;

providing a traceable time value to the distributed system such that the clocks synchronize the time values to the traceable time value when synchronizing and provide a real-world time base when synchronizing the control functions among the nodes;

detecting an abnormal behavior in the distributed system using the real-world time base in the clocks;

applying a corrective action for the abnormal behavior using the real-world time base in the clocks.

12. A method for synchronizing a set of control functions in a distributed system, comprising the steps of:

synchronizing a time value in a clock in each of a set of nodes in the distributed system by exchanging a set of timing messages among the nodes;

synchronizing one or more of the control functions in each node in response to the time values in the corresponding clock;

providing a traceable time value to the distributed system such that the clocks synchronize the time values to the traceable time value when synchronizing and provide a real-world time base when synchronizing the control functions among the nodes wherein the step of synchronizing one or more of the control functions comprises the steps of rendering an observation in a first one of the nodes and obtaining a time from the clock in the first one of the nodes when the observation is rendered;

communicating the observation and the time to a second one of the nodes;

interpreting the observation using the time value from the clock in the second one of the nodes.

13. A method for synchronizing a set of control functions in a distributed system, comprising the steps of:

synchronizing a time value in a clock in each of a set of nodes in the distributed system by exchanging a set of timing messages among the nodes;

synchronizing one or more of the control functions in each node in response to the time values in the corresponding clock;

providing a traceable time value to the distributed system such that the clocks synchronize the time values to the traceable time value when synchronizing and provide a real-world time base when synchronizing the control functions among the nodes wherein the step of synchronizing one or more of the control functions comprises the step of sharing a transducer in the distributed system based on the real-world time base in the clocks.

* * * * *